J. C. THEBERATH.
VEHICLE WHEEL RIM.
APPLICATION FILED NOV. 9, 1917.
1,347,602.
Patented July 27, 1920.
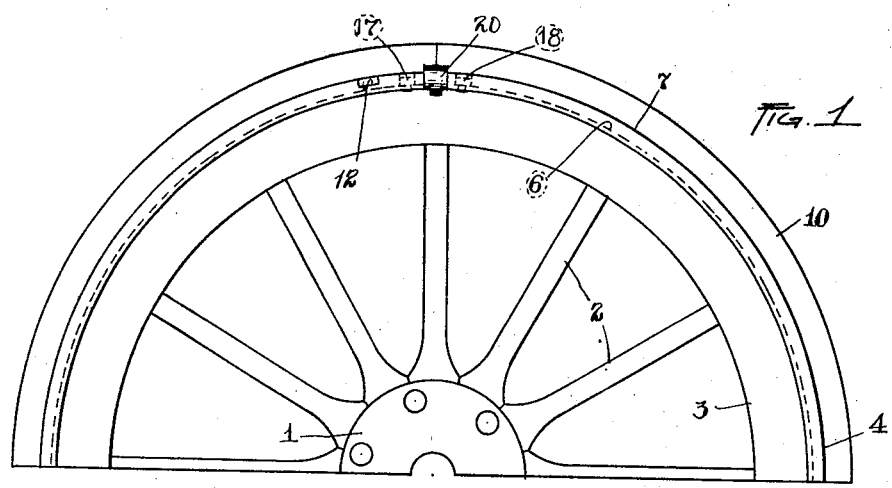
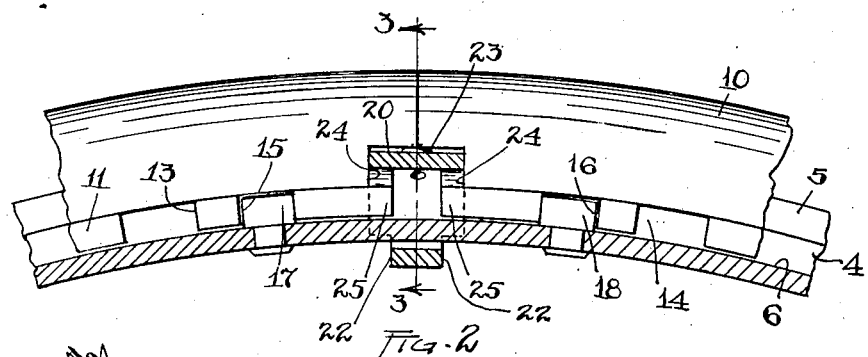
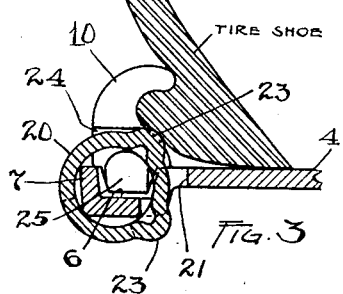
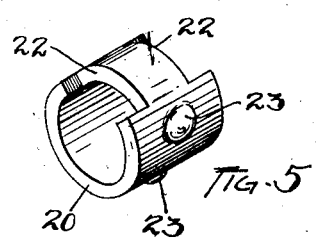
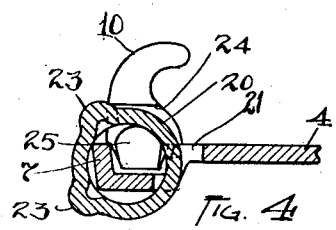
INVENTOR
Joseph C. Theberath.
By Fay, Oberlin & Fay
ATTORNEYS.

UNITED STATES PATENT OFFICE.

JOSEPH C. THEBERATH, OF CLEVELAND, OHIO, ASSIGNOR TO THE STANDARD PARTS COMPANY, OF CLEVELAND, OHIO, A CORPORATION OF OHIO.

VEHICLE-WHEEL RIM.

1,347,602.  Specification of Letters Patent.  Patented July 27, 1920.

Application filed November 9, 1917. Serial No. 201,163.

*To all whom it may concern:*

Be it known that I, JOSEPH C. THEBERATH, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements have as their object the simplification of so-called "Q. D.," or quick detachable, rims for pneumatic tires such as are largely used in connection with automobiles and the like. It will be understood of course that the trade designation "quick detachable" does not refer to the rim proper, but rather to a side-flange on such rim which is rendered detachable in order to facilitate the placing of a tire on, or its removal from, the rim. The present improvements relate more especially to that type of detachable side-flange, or ring, which is transversely split in order to permit it to be taken off and put on the rim, and to the locking device for securing the ends thereof in place when the flange is in operative position.

To the accomplishment of the foregoing and related objects, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1 is a side elevational view of a portion of a wheel body showing a Q. D. rim thereon embodying my present improved construction; Fig. 2 is a side elevational view of the meeting ends of the split side-flange, or ring, with the locking device and the adjacent portion of the rim appearing in longitudinal section; Fig. 3 is a transverse section of the parts appearing in Fig. 2, the plane of the section being indicated by the line 3—3 in said figure; Fig. 4 is a section similar to that of Fig. 3, but showing the locking device in a different operative position; and Fig. 5 is a perspective view of the locking device by itself.

The construction of the wheel body, which is illustrated in part only in the aforesaid drawing, is a matter of indifference so far as the present invention is concerned, consisting, as shown, of the usual hub 1, spokes 2, and felly 3. The rim 4 which surrounds such felly is preferably of the so-called "universal" type, that is it is provided with an abutment 5 around its rear edge (see Fig. 2) adapted to retain in place a continuous side-flange or ring (not shown) which may be reversed to receive and hold either a straight-side or clencher tire, as desired. On the other hand, such rim may, of course, be provided with an integral side flange on such rear edge, of either the straight side or clencher type.

It will also be understood that while the rim illustrated in the drawing is shown as fixedly applied to the wheel body, the construction of detachable side flange and locking device therefor, about to be described, may just as well be utilized on a rim of the so-called demountable sort, that is one which is in turn removably, instead of fixedly, secured onto such wheel body.

The front edge of the rim 4 is provided with an encircling groove or depression 6 conveniently formed by beading such edge, the outer wall 7 of the groove lying flush with, or slighly below, the outer surface of the rim so as to permit the aforesaid reversible side flange (when one is used) to be slipped over it, as occasion may require.

The outer flange 10, as previously indicated, is transversely split at one point in its circumference in order that it may be detachably secured to the rim, said flange having its inner edge 11 formed to seat in the aforesaid groove or depression 6, but being sufficiently resilient to permit its ends to be separated and the ring thus expanded until it can be removed from such groove. One end (the left as shown in Fig. 1) is most conveniently pried out first, the wall of the groove being cut away at 12 to permit the insertion of a screw-driver or like implement, and the inner edge 11 of the ring, which seats in the groove, being cut away at points 13 and 14, spaced a corresponding distance from the respective ends, with the same object in view. This edge is also cut away at other points 15 and 16, shown as being located a trifle closer to the ends of the ring than the notches 13 and 14 referred to, such cut away portions or notches 15 and 16 being adapted to interchangeably engage with lugs 17 and 18 riveted or otherwise formed in the bottom of the groove.

From the foregoing described construction it follows that when the ring or flange 10 is seated in the groove 6 with its ends in juxtaposition, not only is such flange held against circumferential displacement about the rim, but if such ends be secured against displacement radially outwardly the flange as a whole will be effectually locked to the rim.

To thus secure such flange-ends then to the rim, a locking member of the form clearly illustrated in Figs. 2 to 5 inclusive is provided, such member consisting of a ring or annulus 20 rotatably held in place about an axis substantially tangential to the outer edge of the rim by being passed through a recess or aperture 21 formed by cutting way a portion of the inner wall of the bead that forms groove 6. Opposite ends of this ring are in part cut away so as to leave recesses 22, as best shown in Fig. 5. Circumferentially spaced bosses or projections 23 on said ring serve to retain the same in desired rotative position about its axis by engaging with the tire shoe when in place, as shown in Fig. 3, while at the same time limiting such movement by engagement with opposite sides of the side flange 10 respectively when the tire shoe is out of the way. It will be understood that, subject to this limited rotative movement, the ring 20 is fixedly attached to the rim.

The juxtaposed ends of the flange 10 are formed with recesses or notches 24, the effect of which is to form projections 25 on the adjacent portions of the inner edge 11 of said flange. These projections extend within the ring 20 and are normally engaged thereby as in the position of parts shown in Fig. 3, whereby the ends of the flange are obviously locked against radial displacement. Upon rotating the ring 20, however, into the position shown in Fig. 4, the notches or recesses 22 are brought over the projections 25, and the ends of the flange 10 thus left free to be pried out.

The necessary rotative movement of the retaining ring 20 to either free or lock the ends of the side flange 10 in the fashion just described, may be easily effected by the fingers, since it is not required that this ring fit tightly the parts which it encompasses. The pressure of the tire shoe, in other words, may be relied upon to prevent such ring from rattling when the tire is inflated and in use. The ring, moreover, is small enough so that an ordinary pair of pliers can be readily used in order to assist in rotating it. The device is not only simple to operate, but inexpensive to manufacture, and has the further advantage that it cannot possibly become detached or lost from the rim, but forms a permanent fixture thereon.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim; of a side-flange removably mounted on said rim; and a locking member adapted to secure said flange to said rim, said member being rotatable about an axis substantially tangential to the latter into and out of engagement with said flange and said member being formed to contact with the tire shoe when the latter is in place and to be thereby held against rotation.

2. The combination with a wheel rim; of a side-flange removably mounted on said rim; and a locking member for said flange in the form of an annulus directly attached to said rim so as to be rotatable about an axis approximately tangential thereto into and out of engagement with said flange.

3. The combination with a wheel rim; of a split side-flange removably mounted on said rim; and a locking member adapted to secure said flange to said rim, said member being rotatable about an axis substantially tangential to the latter into and out of engagement with the ends of said flange and said member being formed to contact with the tire shoe when the latter is in place and to be thereby held against rotation.

4. The combination with a wheel rim; of a split side-flange removably mounted on said rim; and a locking member for said flange in the form of an annulus directly attached to said rim so as to be rotatable into and out of engagement with the ends of said flange.

5. The combination with a wheel rim; of a split side-flange removably mounted on said rim, said flange being adapted when in place to interlock laterally with said rim and having complementary transverse slots formed directly in its abutting ends; and a locking member for said flange in the form of an annulus directly attached to said rim so as to be rotatable about an axis tangential to said rim's edge, said member being adapted in one position to engage with the slots in said flange-ends and in another position to leave said ends free.

6. The combination with a wheel rim; of a split side-flange removably mounted on said rim, said flange being adapted when in place to interlock laterally with said rim and having complementary transverse slots formed directly in its abutting ends; and a locking member for said flange in the form of an annulus directly attached to said rim so as to be rotatable about an axis tangential to said rim's edge, said member being adapted in one position to engage with the slots in said flange-ends and in another position to leave said ends free, said member being formed to contact with the tire shoe when the latter is in place and to be thereby held against rotation.

7. The combination with a wheel rim; of a split side-flange removably mounted on said rim, said flange being adapted when in place to interlock laterally with said rim and having complementary transverse slots formed directly in its abutting ends; a locking member for said flange in the form of an annulus directly attached to said rim so as to be rotatable about an axis tangential to said rim's edge, said member being adapted in one position to engage with the slots in said flange-ends and in another position to leave said ends free; and means adapted to limit the rotative movement of said member.

8. The combination with a wheel rim; of a split side-flange removably mounted on said rim, said flange being adapted when in place to interlock laterally with said rim and having complementary transverse slots formed directly in its abutting ends; a locking member for said flange in the form of an annulus directly attached to said rim so as to be rotatable about an axis tangential to said rim's edge, said member being adapted in one position to engage with the slots in said flange-ends and in another position to leave said ends free; and circumferentially spaced bosses on said member adapted to limit the rotative movement of the same, one of said bosses being adapted to contact with the tire shoe when the latter is in place and thereby hold said member against rotation.

Signed by me, this 1st day of November, 1917.

JOSEPH C. THEBERATH.